United States Patent Office 3,813,386
Patented May 28, 1974

3,813,386
6-(2 - SUBSTITUTED-2-TRIPHENYLPHOSPHONIUM ACETAMIDO)PENICILLANIC ACIDS
John H. Sellstedt, King of Prussia, Daniel M. Teller, Devon, and Charles J. Guinosso, Abington, Pa., assignors to American Home Products Corporation, New York, N.Y.
No Drawing. Filed Nov. 23, 1971, Ser. No. 201,574
Int. Cl. C07d 99/16
U.S. Cl. 260—239.1                         3 Claims

ABSTRACT OF THE DISCLOSURE

Novel 6(2-substituted - 2 - triphenylphosphonium acetamido)penicillanic acids are described which are useful as anti-bacterial agents.

This invention relates to novel penicillins represented by the formula

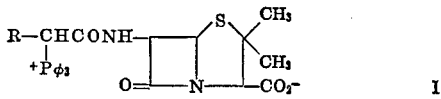

wherein R is a member selected from the group consisting of hydrogen, lower)alkyl, aryl(lower)alkyl, aryloxy, aryl, and a 5 or 6 membered monocyclic heterocyclic unsaturated ring containing one to four hetero atoms selected from the class consisting of nitrogen, oxygen, and sulfur The compounds of formula I are obtained in the form of the inner salt.

The term "lower alkyl" as employed herein includes both straight and branch chain radicals of $C_1$ through $C_7$ carbons as exemplified by methyl, ethyl, propyl, isopropyl, n-butyl, 1,1-dimethyl butyl, n-hexyl, etc. The term "aryl" means phenyl and naphthyl. Aryl(lower)alkyl is illustrated by benzyl, β-phenylethyl, α-phenylpropyl, α-phenylethyl, β-naphthylethyl, etc. Aryloxy is exemplified by phenoxy and naphthoxy. The term "halo" means chlorine, bromine, fluorine, and iodine. The 5 or 6 membered monocyclic heterocyclic unsaturated ring is represented by tetrazinyl, furyl, oxadiazinyl, triazolyl, pyrozolyl, isoxazoyl, etc. The symbol φ used throughout the specification means "phenyl."

The novel penicillins of this invention are prepared according to the following reaction:

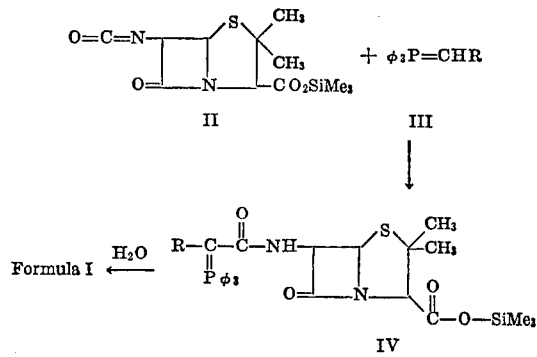

The compound of formula II may be prepared by the procedure described in Example 1. The compounds of formula III may be prepared in accordance with the procedure described by Wittig et al., Organic Synthesis 40, page 66 (1961).

The novel compounds of the present invention are useful as therapeutic agents in poultry and mammals in the treatment of infectious diseases caused by gram-positive and gram-negative bacteria upon parenteral or oral administration. They are also useful in in vitro applications, such as disinfecting compositions.

The following examples serve to illustrate the invention.

EXAMPLE 1

6-isocyantopencillanic acid, trimethylsilyl ester

In a 5 liter three-necked flask equipped with stirrer, dropping-funnel, $P_2O_5$-tube and gas inlet tube, through which nitrogen is admitted, 2 liters of toluene and 150.5 g. (697 mM) of 6-aminopenicillanic acid are placed. 220 ml. (1579 mM) of triethylamine are added and over a period of about 20 min. 250 ml. (approximately 1980 mM) of trimethylchlorosilane are added dropwise. Stirring is continued at room temperature for 2.5 hours after completion of the addition. Another one liter of toluene is added and the temperature is brought to −60° C. Next, 90 ml. (646 mM) of triethylamine are added. Then 112 ml. (about 1.8 moles) of liquid phosgene is added while the temperature of the reaction mixture is kept below −40° C. Stirring is continued for 3 hours at −40° C. At this temperature the precipitate formed is filtered off under nitrogen and washed with 500 ml. of toluene. From the combined filtrate and washing the greater part of the phosgene is removed by evaporating at −40° C. The temperature is then slowly brought to −20° C., under reduced pressure. The remaining traces of phosgene, together with trimethylchlorosilane and triethylamine are removed while the temperature is allowed to slowly rise to +25° C., simultaneously most of the toluene is removed. During the evaporation procedure pressure is maintained between 0.5 and 1.5 mm. Hg. The final volume of the solution is 750 ml. containing 263 mg./ml. of the trimethylsilyl ester of 6-isocyanatopenicillanic acid (yield: 80%).

25 ml. of this solution of the isocyanate in toluene is concentrated under reduced pressure with exclusion of moisture, to a volume of about 10 ml. spontaneous crystallization occurs. 3 ml. of anhydrous toluene are added and the crystalline product is filtered with suction under nitrogen and washed twice with toluene. The crystals are freed from traces of toluene and stored in a nitrogen atmosphere. The yield is about 4 g. of trimethylsilyl ester of 6-isocyanatopenicillanic acid having melting point 85°–88° C. $[\alpha]_D^{20°} = +163.3°$ in toluene. The molecular weight according to mass spectroscopy is 314.

Analysis: (C, H and N) for $C_{12}H_{18}N_2O_4SSi$:
  Calc'd (percent) C, 45.86; H, 5.73; N, 8.92
  Found (percent) C, 45.92; H, 5.78; N, 8.87

EXAMPLE 2

6-[(2-triphenylphosphonium)propionamido] penicillanate inner salt

A hexane solution of 1.6 M n-butyllithium (6.4 ml.) is added to 3.71 g. (10 mM) of ethyl triphenylphosphonium bromide in 30 ml. of toluene at 10–20° C. This solution is stirred for 1 hr. and cooled to −50 to −60° C. The product obtained from this reaction is

To the solution containing this product is added by drip a solution of 3.14 g. (10 mM) of 6-isocyantopenicillanic acid, trimethylsilyl ester in 20 ml. of toluene. This solution is stirred for 1.5 hrs. at −50° to 60° C. and then permitted to warm to room temperature and stirred 1 hr. Ether (100 ml.) and water (2 ml.) are added and the solution stirred for 20 minutes and filtered. The precipitate is washed with ether and dried giving 8.3 g. of the above titled compound.

IR (KBr) 5.6, 5.70 sh, 5.95 sh, 6.15, 6.92, 7.10, 7.52, 8.97, 13.35, 13.80, 14.50

EXAMPLE 3

Following the procedure of Example 2, the following compounds may be prepared by reacting 6-isocyantopenicillanic acid, trimethylsilyl ester with a substituted triphenl phosphonium compound defined below

| $\varphi_3P=CHR$ | Product |
|---|---|
| (a) R=ethyl | 6-[(2-triphenylphosphonium) butyramido] penicillinate inner salt. |
| (b) R=hydrogen | 6-[(2-triphenylphosphonium) acetamido] penicillinate inner salt. |
| (c) R=phenyl | 6-[(2-triphenylphosphonium)phenylacetamido] penicillinate inner salt. |
| (d) R=benzyl | 6-[(2-triphenylphosphonium) β-phenylpropionamido] penicillinate inner salt. |
| (e) R=phenoxy | 6-[(2-triphenylphosphonium) phenoxyacetamido] penicillinate inner salt. |
| (f) R=2-thienyl | 6-[(2-triphenylphosphonium) 2-thienylacetamido] penicillinate inner salt. |

The compounds of formula I of this invention have been found to posses antibacterial activity. Antibacterial screening is carried out by an agar serial dilution technique. Distilled water is used as a vehicle. The stock solution is prepared at 10,000 g./ml. of substance in the vehicle. Two-fold dilutions are made with sterile water. One ml. quantities of each dilution are incorporated into 9 ml. seed agar in sterile petri dishes. The hardened surface is inoculated with test organisms and incubated 18 hours at 35° C. The end point is reported as a minimal inhibitory concentration (MIC) expressed in μg./ml.; the least amount of test substance that will completely inhibit the test organism. The compound of Example 2 when tested against *Staphylococcus aureus* 6538P and *Staphylococcus aureus* Smith produced a MIC value in each case of 15.6 μg./ml. and when tested against *Staphylococcus aureus* 6633 produced a MIC value of 3.90 μg./ml.

The compounds of this invention may be used in cleaning or disinfecting compositions (e.g., dairy barns), at a concentration of about 0.1 to 1% by weight of such compositions dissolved or suspended in a suitable inert carrier for application by washing or spraying.

What is claimed is:

1. A compound selected from the group consisting of the compounds having the formula:

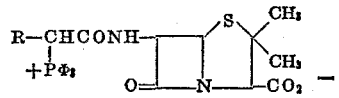

wherein R is hydrogen, lower alkyl, benzyl, β-phenylethyl, α-phenylpropyl, α-phenylethyl, and β-naphthylethyl.

2. A compound according to claim 1 which is 6-[(2-triphenylphosphonium)propionamido] penicillanate inner salt.

3. A compound selected from the group consisting of the compounds having the formula:

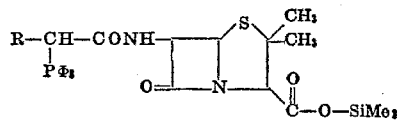

wherein R is hydrogen, lower alkyl, benzyl, β-phenylethyl, α-phenylpropyl, α-phenylethyl, and β-naphthylethyl.

References Cited

UNITED STATES PATENTS

| 3,250,679 | 5/1966 | Jansen et al. | 260—239.1 |
| 3,654,265 | 4/1972 | Essery et al. | 260—239.1 |

NICHOLAS S. RIZZO, Primary Examiner

U.S. Cl. X.R.

424—271